United States Patent [19]

Miley

[11] Patent Number: 4,583,420
[45] Date of Patent: Apr. 22, 1986

[54] HANDWHEEL ACTUATED MACHINE TOOL MECHANISM

[76] Inventor: Bradford A. Miley, Box 71, Durham Rd., Ottsville, Pa. 18942

[21] Appl. No.: 660,867

[22] Filed: Oct. 11, 1984

[51] Int. Cl.⁴ ............................................. B62D 1/04
[52] U.S. Cl. ...................................... 74/557; 74/785; 74/750 R; 82/31; 51/238 R
[58] Field of Search .............. 82/31; 51/238 R; 74/557, 785, 750 R, 820

[56] References Cited

U.S. PATENT DOCUMENTS

| | | | |
|---|---|---|---|
| 190,015 | 4/1877 | Dwight | 112/283 X |
| 1,348,690 | 8/1920 | Barr et al. | 74/750 R |
| 1,432,581 | 10/1922 | Walker et al. | 474/903 |
| 2,468,314 | 4/1949 | Vogel | 74/557 |
| 2,561,936 | 7/1951 | McFerren | 74/750 R X |
| 2,865,242 | 12/1958 | Kemper et al. | 82/31 |
| 2,924,996 | 2/1960 | Brockardt et al. | 74/750 R |
| 3,397,592 | 8/1968 | Müller | 74/548 |

FOREIGN PATENT DOCUMENTS

| | | | |
|---|---|---|---|
| 582509 | 11/1977 | Bulgaria | 74/557 |
| 1139077 | 6/1957 | France | 74/557 |

*Primary Examiner*—Kenneth J. Dorner
*Assistant Examiner*—Shirish Desai
*Attorney, Agent, or Firm*—John W. Logan, Jr.

[57] ABSTRACT

A handwheel actuated machine tool mechanism is disclosed in which a planetary gear arrangement is utilized to effectuate a mechanical advantage in the actuation of the machine tool when desirable, together with a clutch means to cease propulsion of the machine tool when it encounters an obstruction.

4 Claims, 6 Drawing Figures

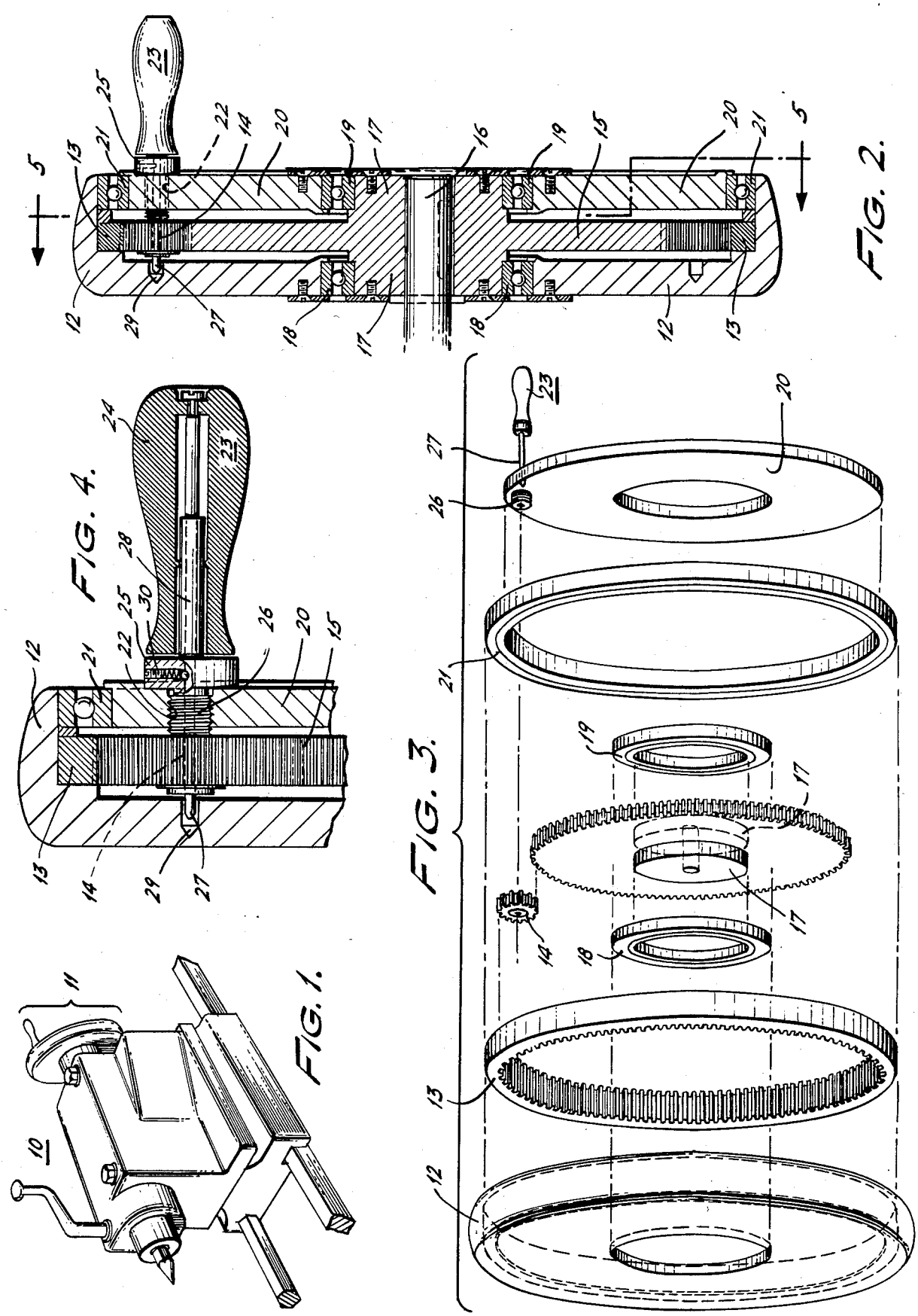

HANDWHEEL ACTUATED MACHINE TOOL MECHANISM

BACKGROUND OF THE INVENTION

The present invention relates to handwheel actuated machine tool mechanisms, and more particularly, to a handwheel mechanism designed to use planetary gearing to actuate the machine tool at a different speed from the rotation of the handwheel.

Actuated machine tool mechanisms are known for use as tail stocks for lathes and as tool feeds for lathe and milling machines. Examples of such machine tool mechanisms are disclosed in the following U.S. Pat. Nos.:

| | | |
|---|---|---|
| 303,897 | N. Thomas | August 19, 1884 |
| 1,598,120 | L. C. Cole | August 31, 1926 |
| 2,865,242 | H. C. Kemper et al. | December 23, 1958 |
| 2,924,996 | F. G. Brockardt et al. | February 16, 1960 |

Although the aforementioned patented actuated machine tool mechanisms may operate satisfactorily, not all provide a clutch action to protect the machine tool and the work product when the tool is actuated. Further, not all permit the operator to increase the speed of the machine tool movement without increasing the cadence of the handwheel. Moreover, none are as simple and inexpensive in construction, operation, and service as is desirable.

Use of planetary gearing in tools and mechanical apparatus is known as a manner of increasing and decreasing mechanical advantage. Examples of such gearing are disclosed in the following U.S. Pat. Nos.:

| | | |
|---|---|---|
| 2,382,110 | L. S. Sheldrick et al. | August 14, 1945 |
| 2,721,591 | W. H. Criswell | October 25, 1955 |
| 2,961,897 | C. W. Musser | November 29, 1960 |

Although the aforementioned patented devices utilize various forms of planetary gear arrangements to effectuate changes in mechanical advantage, none have applied these principles to the problems inherent in actuated machine tool mechanisms.

In light of the foregoing, it is a primary object of the present invention to use planetary gearing to provide an improved handwheel actuated machine tool mechanism.

Another object of the present invention is to provide a handwheel actuated machine tool mechanism with a clutch action when operated at an increased mechanical advantage so to avoid damage which may be caused by a machine tool driven into a work product with excessive force and speed.

A further object of the present invention is to provide a handwheel actuated machine tool mechanism which can be readily operated at, and shifted between, either a normal speed with a direct drive or an accelerated speed with gears proving a mechanical advantage.

An even further object of the present invention is to provide a handwheel actuated machine tool mechanism which incorporates all the aforementioned properties in a simple design which provides ease in construction, operation, and service.

Still a further object of the present invention is to provide a device having the advantages and characteristics as set forth above which may be easily adapted to existing machines as a replacement tool or workpiece feed.

SUMMARY OF THE INVENTION

More specifically, in the present invention there is provided a handwheel actuated machine tool having a handwheel mechanism which includes a circular gear housing containing a ring gear affixed to the gear housing, a driver pinion, a follower gear attached to the drive shaft of the machine tool, and a handle plate which encloses the gear mechanism within the gear housing. Attached to the handle plate is a handle unit which includes a crank handle, a threaded collar which attaches the handle to the handle plate and provides a hub for the driver pinion, and an index pin which is attached to the crank handle and is designed to releasably engage one of a plurality of recesses or openings on the interior of the gear housing.

When the index pin is engaged in the recesses of the gear housing, rotation of the crank handle and handle plate rotates the handwheel mechanism in its entirety. This produces one turn of the drive shaft for every one turn of the handwheel. Alternatively, if a mechanical advantage is desired, the crank handle is pulled away from the handle plate, thus disengaging the index pin; the operator's free hand is then used to hold the gear housing in place. Rotation of the crank handle and handle plate in this mode moves the driver pinion around the ring gear and propels the follower gear and the attached drive shaft. This configuration produces a mechanical advantage which actuates the machine tool at a higher rate of speed. If the machine tool encounters resistance while being driven in this mode, the gear housing will slip in the operator's hand thus ceasing further propulsion in the machine tool.

The result is a handwheel actuated machine tool mechanism which is of simple construction and may be easily moved at a normal or an accelerated speed with less risk of damage to the machine tool or the work product.

DESCRIPTION OF THE DRAWINGS

The operation, features and advantages of the present invention should become apparent from the following description when considered in conjunction with the accompanying drawings, in which:

FIG. 1 shows a perspective view of a lathe tail stock;

FIG. 2 shows a sectional view of the gear mechanism incorporating the present invention, with the gears set for direct drive;

FIG. 3 shows an exploded view of the gear mechanism;

FIG. 4 shows an enlarged fragmentary view of the handle unit shown in FIG. 2;

DETAILED DESCRIPTION OF THE INVENTION

Figure 5:
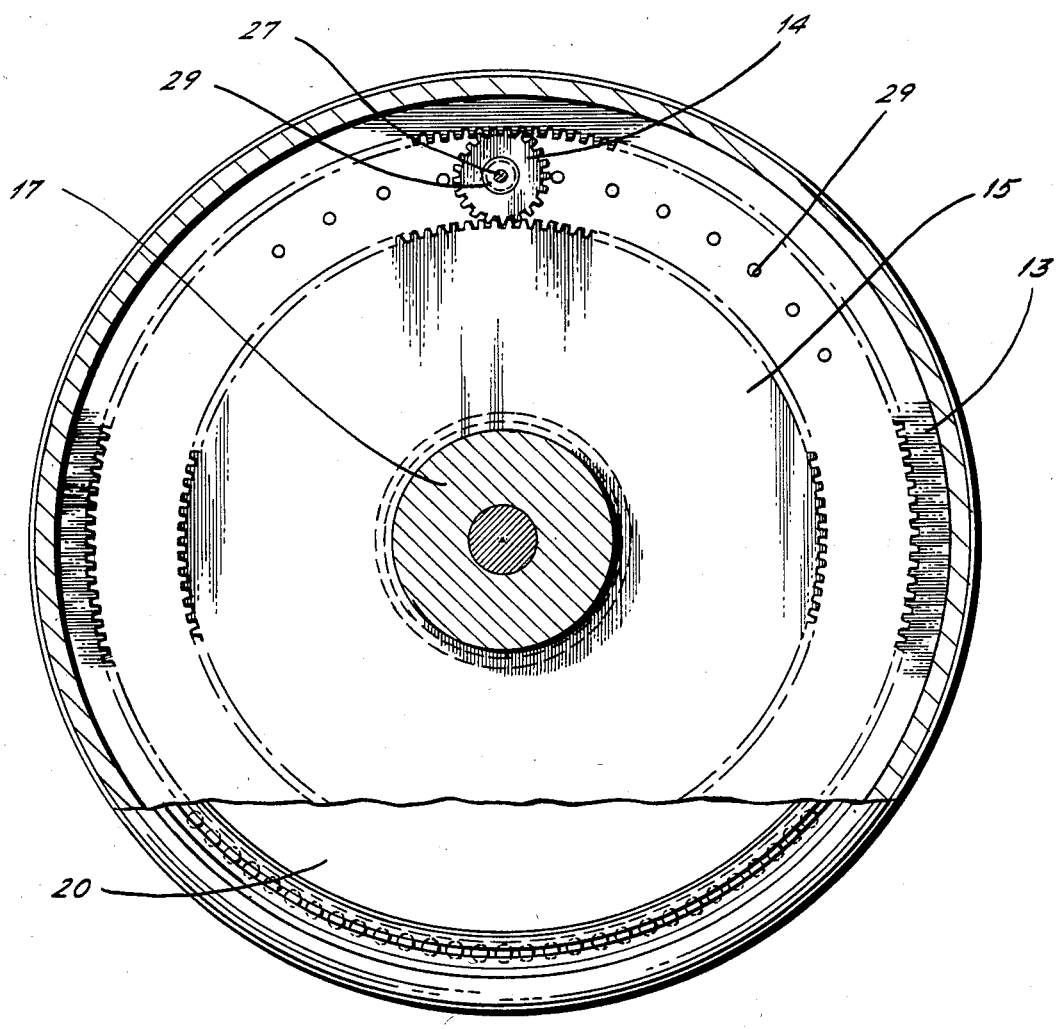
FIG. 5 shows a section on line 5—5 of FIG. 2.

Referring to the drawings, there is illustrated in FIG. 1 a handwheel actuated machine tool 10 containing a handwheel mechanism 11. As may be seen in FIGS. 2 and 3, the handwheel mechanism 11 includes a circular gear housing 12 containing an internally toothed ring gear 13 which is coaxially affixed to the inside surface of the rim of the gear housing 12. The ring gear 13 engages a driver pinion (or planetary gear) 14. The driver pinion 14 in turn engages a follower gear (or sun gear) 15 which is affixed to and drives the drive shaft 16. If desired, more than one driver pinion 14 may be utilized at intervals around the follower gear 15. Coaxially, attached to, or, in the alternative, integral elements of, the follower gear 15 are two cylindrical bearing surfaces 17.

A housing bearing 18 is seated around one of the bearing surfaces 17 and is seated within the gear housing 12. A handle plate bearing 19 is seated around the other bearing surface 17 and is seated within a handle plate 20. The handle plate 20 is seated within a large housing bearing 21 which itself is seated within said gear housing 12. The handle plate 20 contains a threaded hole 22 corresponding with driver pinion 14. If more than one driver pinion 14 is utilized, there should be a hole 22 corresponding to each and every one.

As shown in FIGS. 4 and 5, a handle unit 23 is secured to the handle plate 20 by removably threading into the hole 22. The handle unit 23 consists of a crank handle 24, a collar 25, a pinion hub 26, and an index pin 27.

The collar 25 is affixed to, or, in the alternative, an integral element of, the pinion hub 26. The pinion hub is adapted to thread into the hole 22 in the handle plate 20 and to serve as a hub for the driver pinion 14. The index pin 27 is attached to the extreme end of the crank handle 24 and is supported coaxially within the crank handle 24 by a support sleeve 28. The index pin 27 passes through the collar 25 and the pinion hub 26 to detachably engage one of a plurality of corresponding recesses or openings 29 contained in the gear housing 12.

Figure 6:
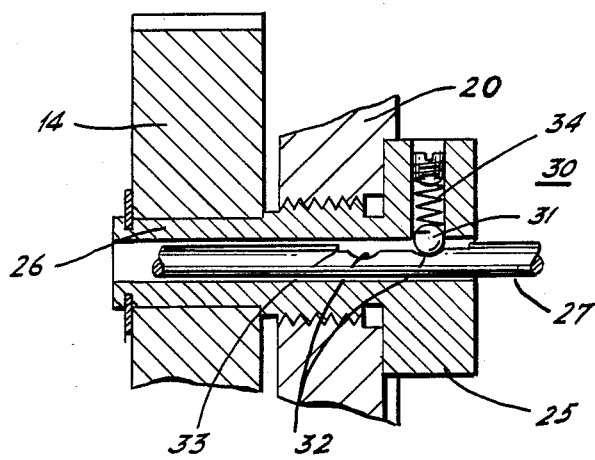
FIG. 6 shows an enlarged fragmentary view of the detent mechanism shown in FIG. 4.

As shown in FIG. 6, the collar 25 contains a detent mechanism 30 designed to control the movement of the index pin 27. The detent 30 consists of a ball 31 adapted to engage one of two dimples 32 formed within an indented segment 33 of the index pin 27, and a spring 34 which assists in retaining the ball 31 within the dimples 32.

In the illustrated embodiment, when the handle unit 23 is in the inward or closed position, the index pin 27 is engaged in one of the recesses 29 in the gear housing 12. Cranking of the handwheel 11 in this configuration causes the entire handwheel 11 and all its component parts to move together. This produces a direct drive of the drive shaft 16 with a drive ratio of 1 (i.e. one revolution of the drive shaft 16 for every one revolution of the crank handle 24 and handle plate 20).

Alternatively, if it is desirable to increase the mechanical advantage so to move the machine tool more rapidly, the handle unit 23 can be pulled into the outward or open position. When in this position the index pin 27 no longer engages the recesses 29 in the gear housing 12. The machine operator then uses one hand to hold the gear housing 12 in place and the other hand to crank the handwheel 11. The driver pinion 14 travels within the ring gear 13 and drives the follower gear 15. In this mode a mechanical advantage is achieved producing the following established planetary gearing drive ratio:

$$\text{Drive Ratio} = \frac{\text{Number of Teeth on Ring Gear}}{\text{Number of Teeth on Follower Gear}} + 1$$

In the event that the machine tool encounters an obstruction, the gear housing 12 will slip in the operator's hand thus producing a clutch effect. This avoids costly damage that could result from the machine tool being driven with excessive force and speed into the work product.

The invention may be applied with similar effectiveness as a tail stock of a lathe, or as a tool feed for lathe or milling machines. It has the advantage of the aforementioned clutch action which avoids the potential for equipment and product damage inherent in other designs of this nature which operate at an increased mechanical advantage. Moreover, the invention is of relatively simple and inexpensive design which does not sacrifice efficiency. The simplicity and accessibility of the gear mechanism also adds to the ease of service and repair of the device.

While a particular embodiment of the present invention has been disclosed herein, it is not intended to limit the invention to such a disclosure, and changes and modifications may be incorporated and embodied within the scope of the following claims.

What is claimed is:

1. A handwheel mechanism for a handwheel actuated machine tool comprising
   a gear housing surrounding and containing:
      an internally toothed ring gear affixed to said gear housing,
      as least one driver pinion which engage both said ring gear and
      a follower gear which is affixed to a drive shaft for said machine tool, and
      a handle plate with at least one hole; and
   a handle unit affixed to one of said holes containing:
      a crank handle,
      a securing means for attaching said handle unit to said hole,
      a hub for said driver pinion attached to said securing means, and
      an index means attached to said crank handle and adapted to releasably engage at least one opening or recess in said gear housing.

2. Apparatus in accordance with claim 1 wherein bearing means support said follower gear within said gear housing and said handle plate.

3. Apparatus in accordance with claim 2 wherein bearing means support said handle plate within said gear housing.

4. Apparatus in accordance with claim 3 wherein said handle unit includes detent means for retaining said index means in both an engaged and a disengaged position with respect to said gear housing.

* * * * *